No. 619,267. Patented Feb. 14, 1899.
J. H. BATCHELDER.
EGG CASE MACHINE.
(Application filed Oct. 11, 1897.)
(No Model.) 8 Sheets—Sheet 1.

No. 619,267. Patented Feb. 14, 1899.
J. H. BATCHELDER.
EGG CASE MACHINE.
(Application filed Oct. 11, 1897.)

(No Model.) 8 Sheets—Sheet 3.

No. 619,267. Patented Feb. 14, 1899.
J. H. BATCHELDER.
EGG CASE MACHINE.
(Application filed Oct. 11, 1897.)
(No Model.) 8 Sheets—Sheet 4.

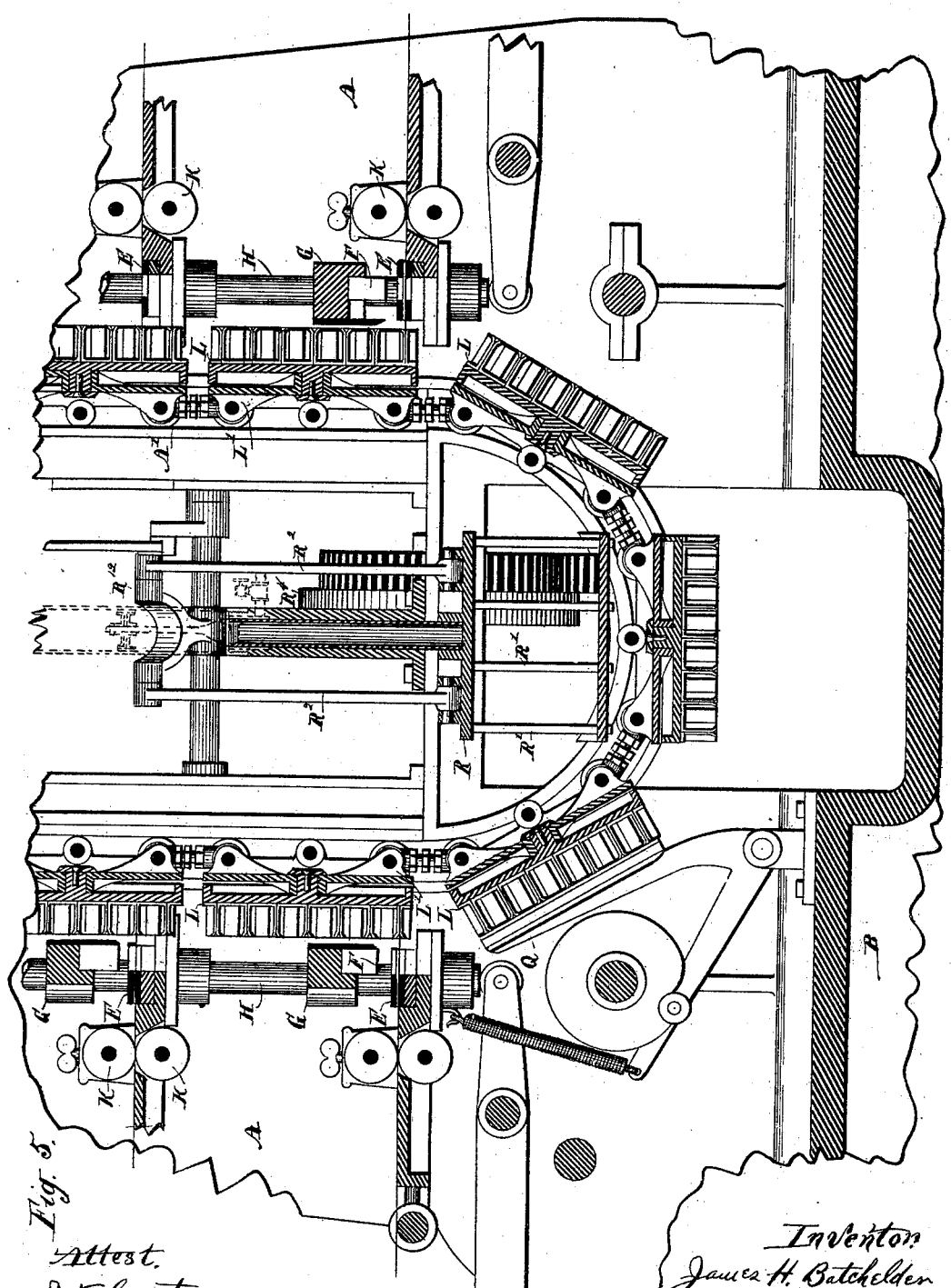

No. 619,267. Patented Feb. 14, 1899.
J. H. BATCHELDER.
EGG CASE MACHINE.
(Application filed Oct. 11, 1897.)
(No Model.) 8 Sheets—Sheet 6.
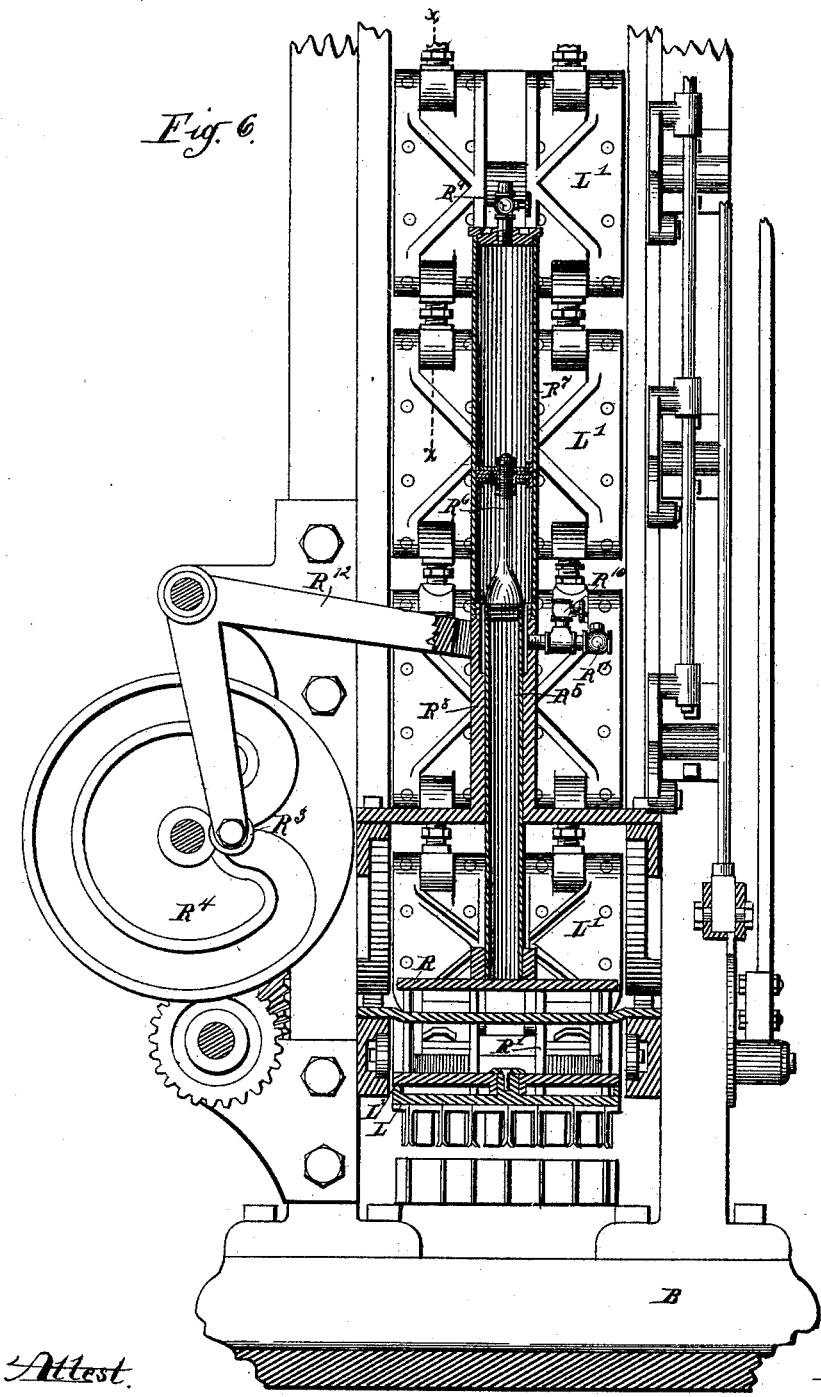

No. 619,267. Patented Feb. 14, 1899.
J. H. BATCHELDER.
EGG CASE MACHINE.
(Application filed Oct. 11, 1897.)
(No Model.) 8 Sheets—Sheet 7.
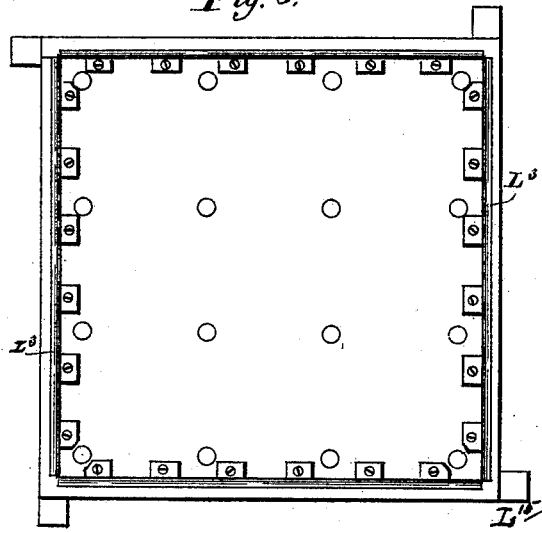
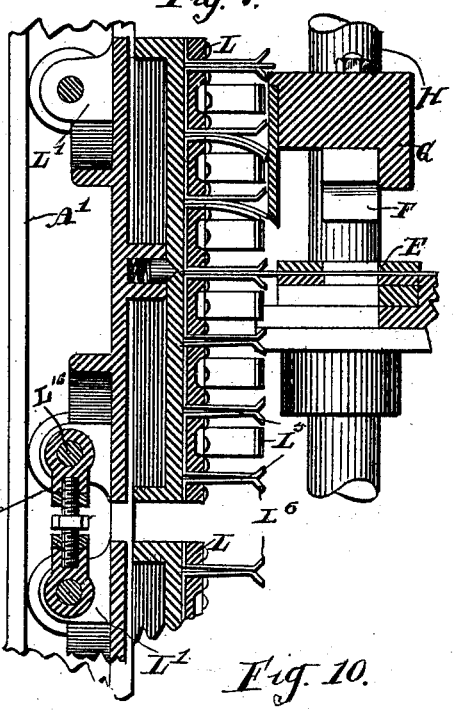
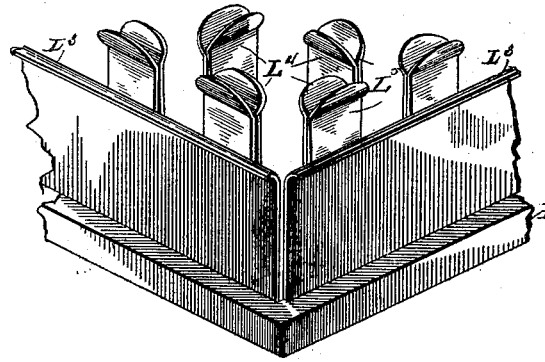
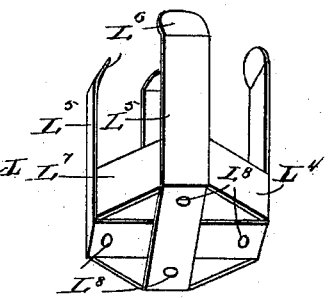

No. 619,267. Patented Feb. 14, 1899.
J. H. BATCHELDER.
EGG CASE MACHINE.
(Application filed Oct. 11, 1897.)

(No Model.) 8 Sheets—Sheet 8.

Attest.
J. F. Groat,
Jos Kubicek

Inventor:
James H. Batchelder
By J. Mc. S. John
Atty.

UNITED STATES PATENT OFFICE.

JAMES H. BATCHELDER, OF TAMA, IOWA.

EGG-CASE MACHINE.

SPECIFICATION forming part of Letters Patent No. 619,267, dated February 14, 1899.

Application filed October 11, 1897. Serial No. 654,753. (No model.)

*To all whom it may concern:*

Be it known that I, JAMES H. BATCHELDER, a citizen of the United States, residing at Tama, in the county of Tama and State of Iowa, have invented certain new and useful Improvements in Egg-Case Machines; and I do hereby declare the following to be a full, clear, and exact description of the invention, such as will enable others skilled in the art to which it appertains to make and use the same.

This invention relates to machines for automatically cutting, punching, and matching together strawboard strips to form cell-cases, commonly known as egg-case "fillers."

The object of this invention is to improve the construction of a machine of this type so as to render it more efficient, accurate, and reliable.

The invention consists in certain novel features of construction, which will be hereinafter fully described, and particularly pointed out in the claims.

Figure 1:
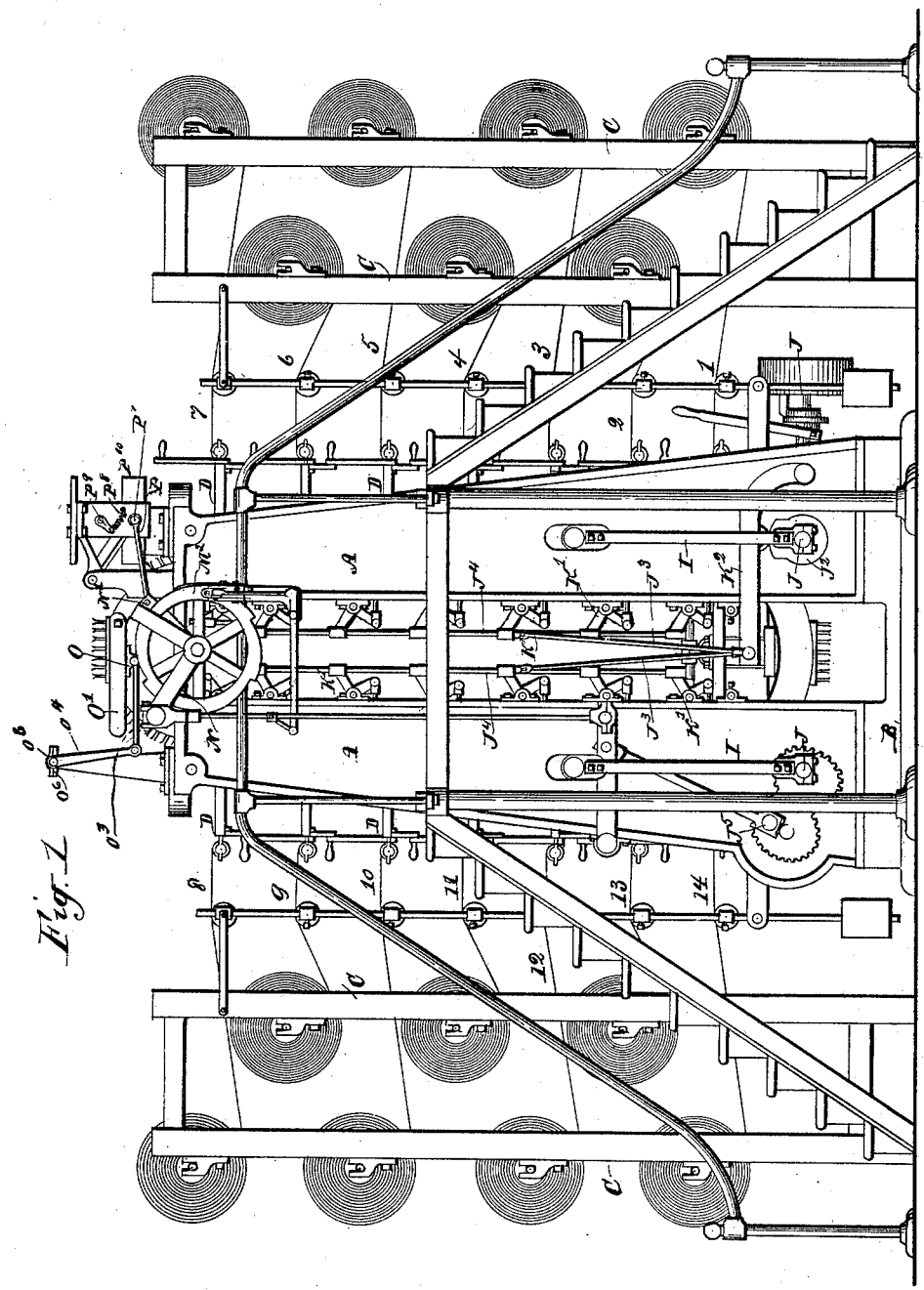
Figure 2:
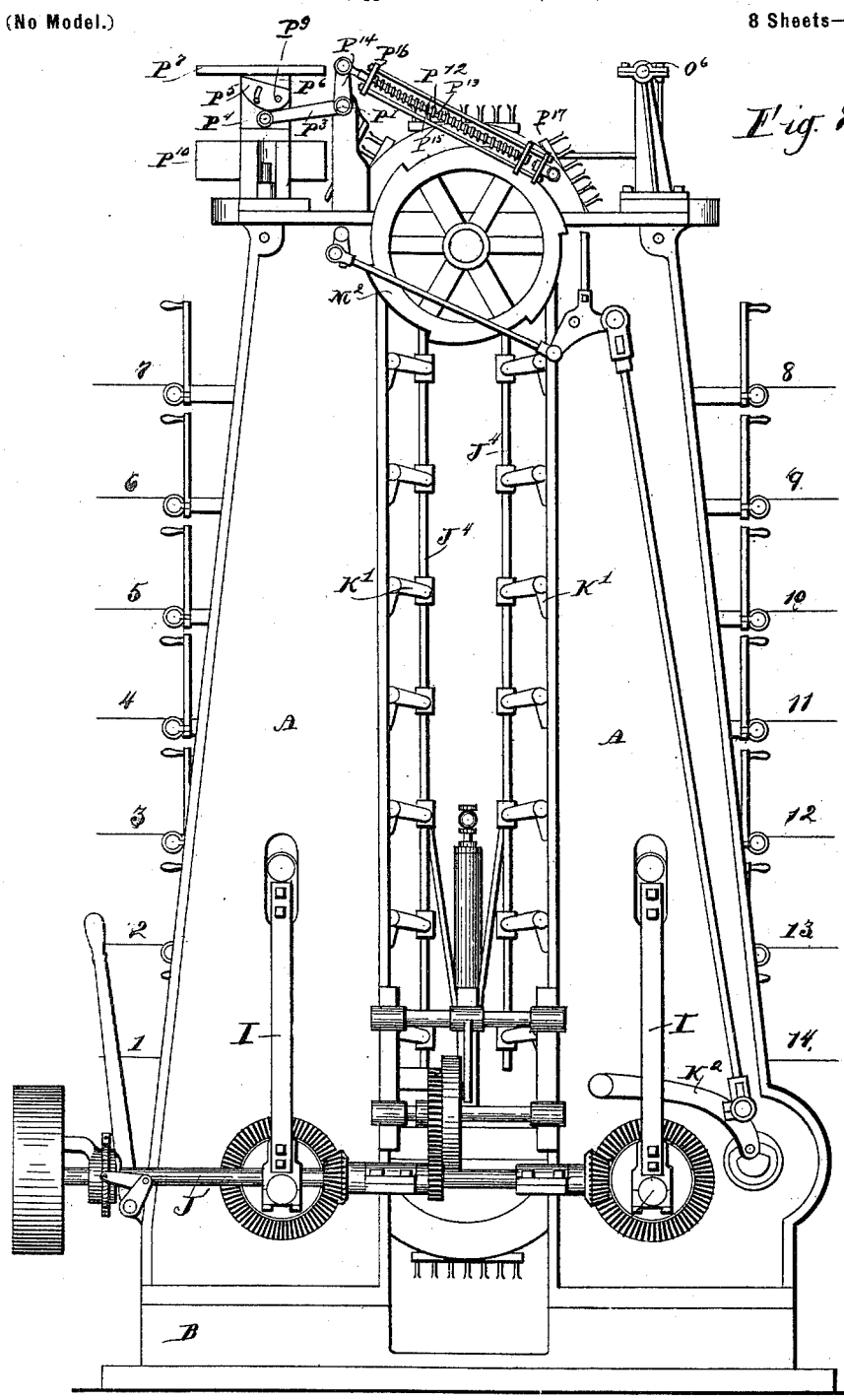
Figure 3:
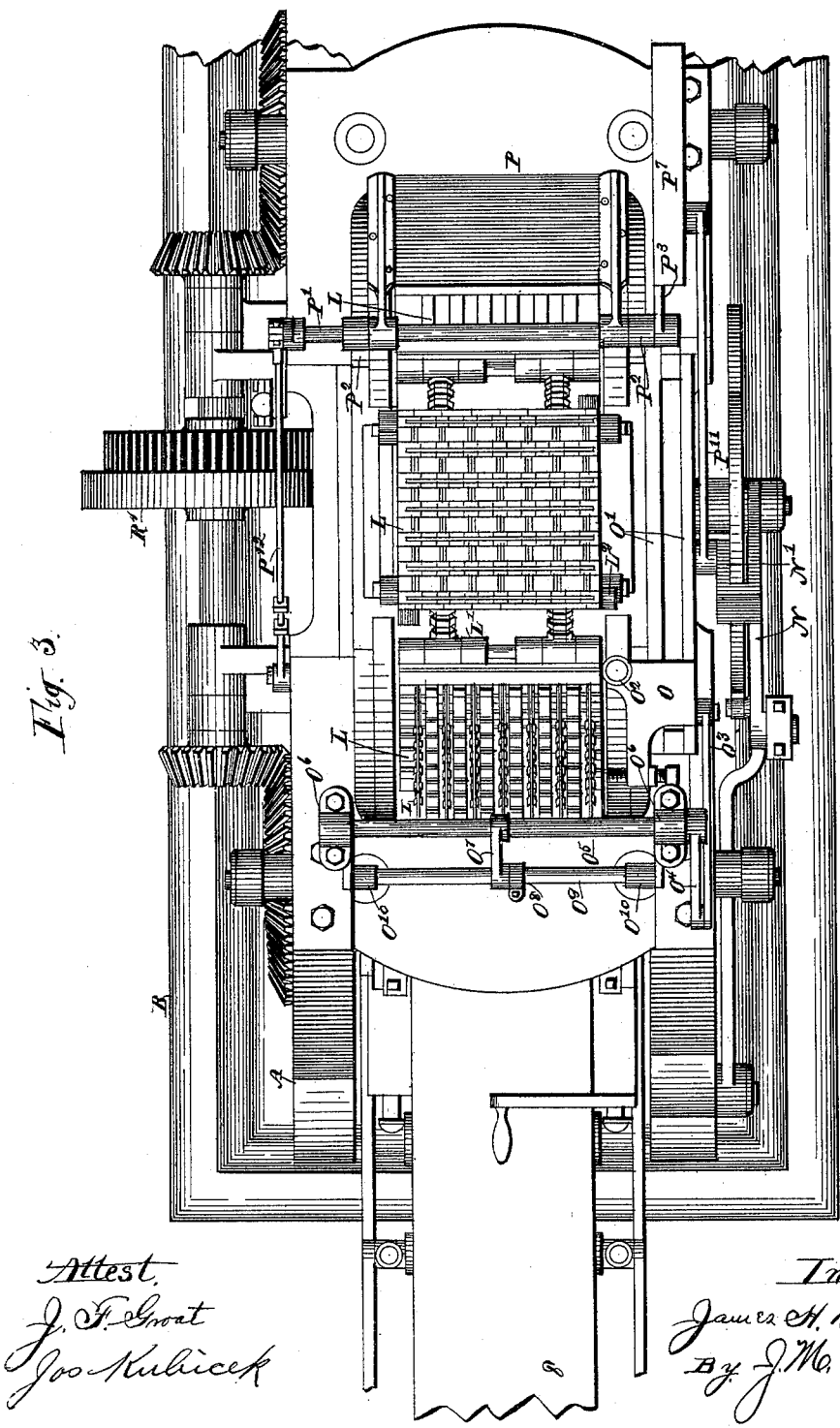
Figure 4:
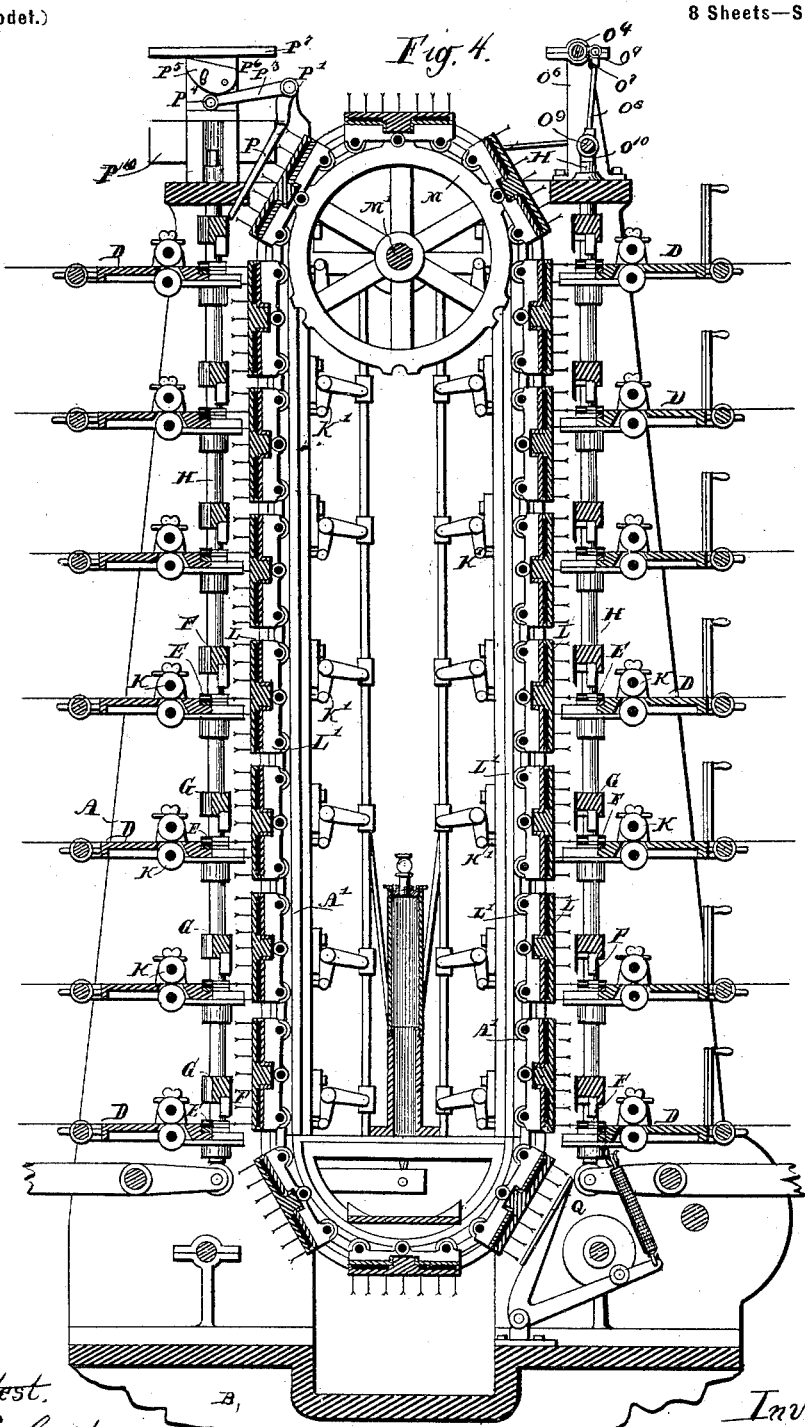
Figure 11:
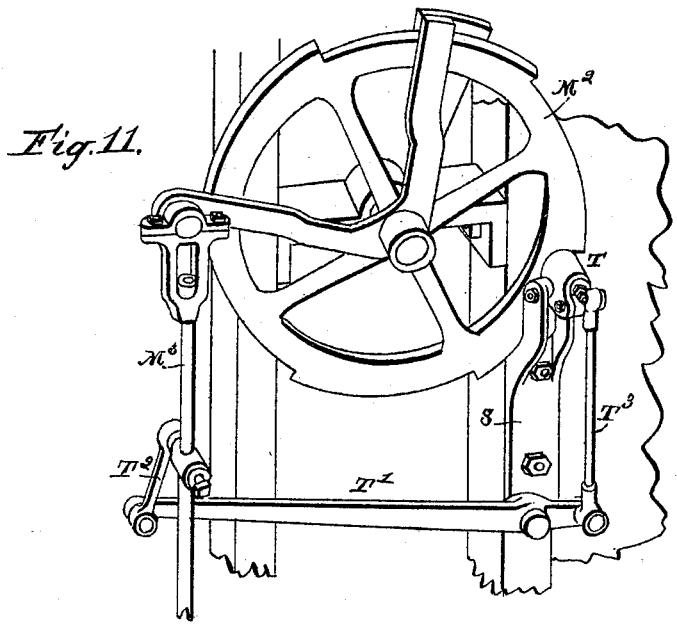
Figure 13:
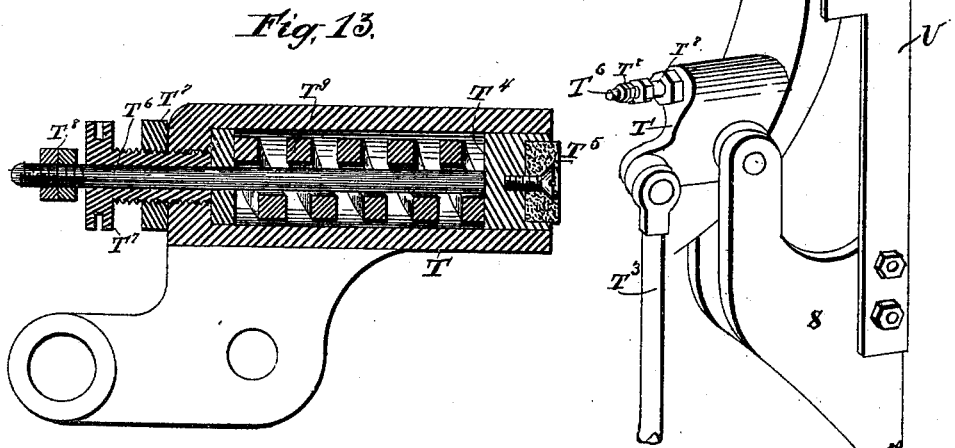
Figure 12:
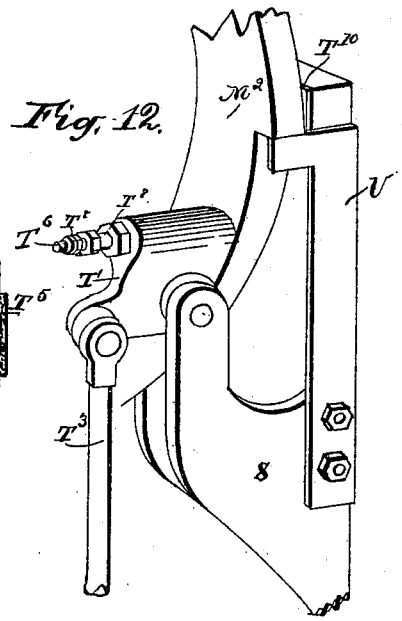

In the accompanying drawings, forming a part of this specification, Figure 1 is a side elevation of a machine embodying my invention as in use. Fig. 2, Sheet 2, is a similar view of the opposite side, but without the reel-frames. Fig. 3, Sheet 3, is a partial plan view of the machine. Fig. 4, Sheet 4, is a central vertical section in a longitudinal plane, showing the internal mechanism of the machine, seen from the same side as Fig. 2. Fig. 5, Sheet 5, is an enlarged sectional fragmentary view of the lower part of the machine in the same plane as Fig. 4, but seen from the opposite side. Fig. 6, Sheet 6, is a fragmentary section of the lower part of the machine in a central vertical plane transverse to that employed in Fig. 5. Fig. 7, Sheet 7, is a sectional view in the plane of line $x\,x$, Fig. 6, and as seen from the right of said line. Fig. 8 is a plan view of one of the strip-carrying forms as seen from the side presented to the strips, but without the holding-fingers being shown. Fig. 9 is a fragmentary view in perspective, showing one corner of a strip-holding form or carrier with retaining-fingers and lateral guides in position. Fig. 10 is a view in perspective of an improved form of strip-holding finger. Fig. 11, Sheet 8, is a fragmentary view in perspective, showing the brake mechanism. Fig. 12 shows the brake and dog from another point of view. Fig. 13 is a central longitudinal section of the brake in a vertical plane.

Similar letters of reference indicate corresponding parts.

The machine in the main is the same as that described in Letters Patent No. 575,096, issued to me on the 12th day of January, 1897, and also in my pending application for Letters Patent, Serial No. 631,409, filed April 9, 1897, to which for a more particular description reference may be had.

This invention relates to certain improvements not heretofore shown or described. In order to have a clear understanding of these features and their relation to the machine in general, the machine may be briefly described as follows:

A supporting-frame A is mounted on a suitable base B. Adjacent to each end of the frame are suitable reel-frames C, on which are mounted rolls of strawboard equal to the whole number of strips used in the cell-case— in this instance fourteen, as indicated by the numbers applied to said rolls. A vertically-arranged series of tables D in each end of the main frame gives support to as many sets of dies E, which coact with corresponding punches F, attached to cross-heads G, secured to vertically-reciprocating guide-rods H, which, through connecting-rods I, receive their motion from crank-shafts J, driven by a cross-shaft J' and suitable power-transmitting gearing. The strawboard is intermittently and simultaneously fed forward under the punches and into the fingers of the carriers by feed-rolls K, to which the requisite movement is imparted by a series of bell-crank levers K', receiving their movement from a cam $J^2$ through the medium of an oscillating lever $K^2$ and suitable connecting-rods $J^3$ and $J^4$. It will be understood that the movement of the bell-cranks is transmitted through suitable pawl-and-ratchet mechanism (not herein fully illustrated, but clearly shown and described in the Letters Patent and pending application hereinbefore referred to) to the feed-rolls, between which the strawboard passes. Directly in front of the punches is a series of strip-carriers L, mounted revolubly on suitable trucks L', the wheels of which run in endless tracks A', extending around the inner part of the main frame on both sides. Intermittent movement is given to these carriers by a sprocket-wheel M on a shaft M', to which is attached a ratchet $M^2$, actuated by a suitable pawl connecting with a bell-crank lever N, receiving movement from a crank $J^5$ through intermediate connecting mechanism, as clearly illustrated in Fig. 1.

The strips are fed into the holding-fingers of the carriers progressively, as shown in Fig. 4, the carriers moving one cell-space less each time than the distance between the respective sheets from which the strips are severed, so that any carrier is filled in one direction in its movement from the bottom to the top of the machine. At the top of the machine the carriers are successively given a quarter-turn and in the same manner are filled with cross-strips as they move to the bottom of the machine, where the finished cell-case or filler is finally ejected. Provision is also made for pushing home the strips partially inserted between the fingers of the carriers, both at the upper and lower ends of the machine. These parts, and also the quarter-turn and ejecting mechanism, are more specially related to the improvements herein and will be particularly described.

In the machine as described in the patent and application above referred to the construction of the quarter-turn, the ejecting, and the upper bottoming apparatus was such as to prevent the running of the machine as fast as it might otherwise do. The defects in the former construction will be referred to in connection with the description of these improvements.

The device for making the quarter-turn of the strip-carriers consists in a cross-head O, sliding back and forth on suitable guides O' and provided with a roller $O^2$ or the like to engage a stud $L^2$ at each corner of the revoluble carrier-table L. Heretofore this cross-head has been connected by a suitable link with one arm of the bell-crank lever N', and the movement was so quick relatively that the carrier-tables were subjected to a sudden hard shock, thus limiting the speed at which the machine might be safely run. The improvement consists in connecting this cross-head by a suitable link $O^3$ with an arm $O^4$ on a rock-shaft $O^5$, mounted on suitable standards $O^6$ at the top of the machine. To a short crank-arm $O^7$ is connected a link $O^8$, attached to a shaft $O^9$, mounted in bearings $O^{10}$, secured to the upper ends of the guide-rods H. The cross-head thus takes the steady reciprocating movement of the guide-rods, and the quarter-turn is effected much more rapidly and without injury to the carriers.

It is to be understood that formerly the cross-head having the traverse movement which quarter-turns the strip-carrier was connected by intermediate mechanism with one of the pair of elliptical gears from which the intermittent movement of the train of strip-carriers was derived. While the gearing secured the desired movement for the carriers—slow advance and quick return—the effect on the quarter-turn mechanism was the reverse, giving a quick sharp blow on the strip-carrier in its forward movement and a slow return. In its present construction the quarter-turn device takes the regular reciprocating movement of the main punch-actuating cranks.

The strips are fed into the holding-fingers of the carriers before being cut off; but this initial feed does not push them home to final position. They are driven to such ultimate position or bottomed by means of an oscillating plate P, connecting with a rock-shaft P', mounted in bearings $P^2$ at the top of the machine. The rock-shaft is provided with an arm $P^3$, with a roller $P^4$ at the outer end, and this engages with an oscillating cam $P^5$, pivoted to a cross-head $P^6$ and adapted to swing up against a top plate $P^7$ at its free end when the roller has passed through, being carried to this position by a spring $P^8$, connecting with an arm $P^9$ on the cam-pivot. The cross-head slides on a guide $P^{10}$ and receives motion from the arm N' of the bell-crank N through the medium of a connecting-rod $P^{11}$. This construction is such as to allow the bottomer under tension of the spring $P^{12}$ to fly out of contact with the strips almost instantly after they are driven home, and thus allow for the forward movement of the strip-carrier, which closely follows this operation. This spring is of a well-known type of compression coil-spring, being mounted on a rod $P^{13}$, connecting with an arm $P^{14}$ on the rock-shaft B'. The other T-head of this rod slides on the side rods $P^{15}$, connected at one end by a plate $P^{16}$ to take the thrust of the spring and at the other end by a bearing-plate $P^{17}$, which is pivoted to a suitable stud on the main frame.

The bottomer at the lower part of the machine Q being the same as in the pending application above referred to need not be particularly described.

The finished cell-case is ejected at the bottom of the machine by an ejector R, having a series of rods R', which pass through holes in the carriers and engage the cell-case at the intersections of some of the strips. A quick intermittent movement is imparted to this ejector by a bell-crank lever $R^{12}$, one end of which connects with the ejector-head by a pair of links $R^2$ and the other by a suitable roller $R^3$ with a cam $R^4$, receiving motion by suitable gearing from the driving-shaft. As originally constructed the travel of the ejector was so great and its movement so sudden that it produced a shock detrimental to the machine if run at the desired speed. This defect is remedied by providing an air-cushion to absorb the shock at the ends of the ejector's stroke. The stem $R^5$ of the ejector is provided with a piston $R^6$, fitting a cylinder $R^7$, attached to the upper end of the guide-bearing $R^8$, in which said stem slides.

A valve R⁹ at the upper end of the cylinder is adapted to be slightly opened, so that the piston is not too much impeded, and a similar valve R¹⁰, together with a check-valve R¹¹, serves the same purpose at the lower end of the cylinder. It is to be observed, however, that the valve R¹⁰ does not impede the inflow of air at the lower end through the check-valve, being in a lateral branch, as shown. The weight of the ejector dispenses with the need of a check-valve at the upper end. The device is practically an air-pump, the valves R⁹ at the upper end and R¹⁰ serving to throttle the inlet and escape of air as the action of the machine may require. The reciprocating movement of the piston alternately forces the air out and draws it in at both ends of the cylinder; but the valves may be throttled so as to cushion the piston at both ends of its stroke. Not to impede the upward movement of the piston, against which the weight of the apparatus operates, air is admitted freely through a check-valve R¹¹, and the piston is accordingly only obstructed in this direction by the cushion of air above, the escape of which may be regulated at will. In its downward movement the piston has the weight of the parts in its favor and no provision need be made for admitting the air any more rapidly than it escapes.

Running at a considerably higher rate of speed than formerly, the momentum given to the train of strip-carriers at each forward movement is sufficient to carry them beyond their proper stopping-point unless retarded. A brake is therefore provided to check the movement of the carriers when near the end of each step. On a suitable bracket S, secured to the main frame near the ratchet-wheel M², is pivoted a lever T, to which an oscillating movement is given by a longer lever T', connecting at one end with the reciprocating rod M³, which transmits motion to the ratchet-wheel by a suitable link T² and at the other end by another link T³, connecting with the lever T. In the cylindrical head of the lever T is fitted a piston T⁴, the head of which is faced with a disk of fiber T⁵. The piston-stem T⁶ passes through an adjusting-gland T⁷ and is provided with jam-nuts T⁸ on its threaded outer end, by means of which the tension of a strong spring T⁹ may be regulated. The outward thrust of the piston is regulated by the gland T⁷. At each movement of the ratchet-wheel when near the end of its stroke the brake rocks into contact with the outer face of the wheel. Back of the wheel is placed another piece of fiber T¹⁰, against which the wheel is pressed by the contact of the brake. A strong spring latch or dog U, attached to the bracket, prevents any possible backlash.

An improvement in the strip-carriers consists in providing them with marginal flaring keepers L³, against which the ends of the strips abut, preventing any possible slipping out of exact position by reason of the vibration of the machine or otherwise. In Fig. 10 is shown one of the main holding-fingers L⁴, and its position in relation to the other fingers is indicated in Fig. 9. This finger is composed of a pair of rectangularly-bent side strips L⁵, crossing each other at right angles and having inwardly-bent lips L⁶ at the upper ends. The sides are tied and braced by an octagonal brace-strip L⁷, soldered fast to them on the inside near the bottom. Screw-holes L⁸ are provided for attachment of the finger to the strip-carrier plate.

In my machine as heretofore illustrated and described the strip-carrier trucks were not actually connected, in one case being provided with abutments to give pushing contact and in the other case with open-ended links for the same purpose. In this application I have shown closed links L¹⁵ engaging the axles L¹⁶ of the trucks and adapted to pull as well as push. By this means I am able to practically suspend the whole train of carriers from the sprocket at the upper end of the machine and effect a considerable reduction in the element of friction. It also admits of the outer rail of the track being entirely removed at the upper and lower ends, so as to permit the removal of a carrier either at the top or bottom, as desired.

A positive stop for the train of strip-carriers is illustrated in Fig. 2, being also shown in the pending application hereinbefore referred to. It consists, essentially, of a pair of oscillating pawls U' and U⁵, receiving concurrent motion through the medium of a connecting-rod U⁶ from a rod U², connecting with an oscillating arm U³, taking its motion from a cam U⁴ on one of the cross-shafts of the machine.

Having thus described my invention, what I claim as new, and desire to secure by Letters Patent, is—

1. In an egg-case machine, the combination with feeding, cutting and punching mechanism, substantially as described, of a series of revoluble strip-holding forms, a series of trucks or carriages on which said forms are revolubly mounted, links positively connecting said trucks, guide-tracks for said trucks, a sprocket-wheel engaging said trucks and mechanism adapted to give intermittent motion to said sprocket-wheel.

2. In an egg-case machine, the combination with feeding, cutting and punching mechanism, of a series of revoluble strip-holders, a series of positively-connected trucks on which said strip-holders are mounted, means substantially as described for moving the strip-holders intermittently close to the punching mechanism, and side plates attached to the strip-holders to hold the strips from slipping endwise, as described.

3. In an egg-case machine, the combination with an oscillating strip-bottomer, of a spring to throw it out of contact with the strips, an arm adapted to engage a reciprocating cam to depress said bottomer, and a reciprocating cam having a pivoted cam-block to guide said arm in one path while moving in one direction, and in another path during the reverse movement.

4. In an egg-case machine, the combination with a revoluble strip-holding form provided with suitable projections, of a reciprocating cross-head adapted to engage said projections and turn the form one-quarter of a revolution, punch-head guide-rods having a constant reciprocating movement, a rock-shaft, and bell-crank levers and connecting-links to transmit movement from said guide-rods to said cross-head.

5. In an egg-case machine, the combination with an ejector and its operating mechanism, substantially as described, of a cylinder mounted above said ejector, a piston connected with the guide-stem of the ejector, a valve at the upper, closed end of the cylinder, to regulate the admission and exclusion of air at that end, and a check-valve and a regulating-valve at the lower end, substantially as and for the purpose set forth.

6. In an egg-case machine, the combination with a train of strip-carriers and mechanism for operating them intermittently through the medium of a sprocket-wheel and ratchet-wheel, of an automatic brake adapted to press at two opposite points on the rim of said ratchet-wheel when near the limit of its stroke, and stop the same by friction, as specified.

7. In an egg-case machine, the combination with a train of strip-carriers and a sprocket-wheel for actuating them intermittently, of a ratchet-wheel a reciprocating rod to communicate motion to said ratchet-wheel, a yielding, friction-brake oscillating in and out of contact with said ratchet-wheel, and a lever connected with said rod and brake, substantially as and for the purpose set forth.

8. In an egg-case machine, the combination with a train of strip-carriers, and a ratchet-wheel to actuate the same, of a brake for said ratchet-wheel, consisting essentially of a friction-plate lying close to one face of the wheel, and an intermittently-oscillating brake adapted to engage the face of the wheel opposite said friction-plate, said oscillating brake having a yielding plunger faced with a suitable frictional material, as fiber, and means for automatically oscillating said brake, substantially as described.

9. In an egg-case machine, the combination with the ratchet-wheel for driving the train of strip-carriers, of a brake consisting essentially of a friction-plate adjacent to one face of said wheel, a yielding, oscillatory, friction-brake opposite thereto, and a spring latch or dog to prevent backlash by engaging the tooth of the ratchet-wheel, substantially as described.

In testimony whereof I affix my signature in presence of two witnesses.

JAMES H. BATCHELDER.

Witnesses:
W. J. FORBES,
C. A. ISE.